United States Patent

Kurle

[11] 3,720,390
[45] March 13, 1973

[54] PARACHUTE RELEASE DEVICE AND METHOD
[75] Inventor: Arthur R. Kurle, McLean, Va.
[73] Assignee: Halliburton Company, Duncan, Okla.
[22] Filed: Feb. 12, 1971
[21] Appl. No.: 114,896

[52] U.S. Cl. ............................................. 244/149
[51] Int. Cl. ............................................. B64d 17/54
[58] Field of Search ............................. 244/149, 150

[56] References Cited

UNITED STATES PATENTS

| 3,291,424 | 12/1966 | Hatfield et al. | 244/149 |
| 3,437,295 | 4/1969 | Istel et al. | 244/150 |
| 2,353,440 | 7/1944 | Bresee | 244/150 |
| 3,468,502 | 9/1969 | Kinney | 244/150 |
| 2,525,608 | 10/1950 | Kuntz | 244/150 |
| 2,525,607 | 10/1950 | Kuntz | 244/150 X |

Primary Examiner—Milton Buchler
Assistant Examiner—Gregory W. O'Connor
Attorney—Burns, Doane, Swecker & Mathis

[57] ABSTRACT

A parachute release device with a delayed releasing means for selectively providing a release initiating stroke through a substantially constant force power spring acting on a parachute ripcord. A housing contains a function control assembly for providing various release initiating conditions, the control assembly allowing the cocking of the power spring provided the delayed releasing means is preset to its proper condition. The function control assembly contains two cam sections for both selectively preventing the cocking of the power spring and for controlling release of the spring. A slide block permanently attached to the spring and having a cam engageable retaining edge cooperates with a sear having a locking edge, which selectively holds the spring in a cocked position, and with a blocking mechanism having a blocking edge for selectively preventing cocking of the spring. A safe condition is provided wherein the sear is cammed into a locked condition to prevent release regardless of the position of the delayed releasing means. An additional safety feature comprising a pull-pin assembly is provided to selectively stop the operation of the delayed releasing means, at the option of the parachutist. The entire assembly is mounted on the parachutist's harness with its operating end being connected to the parachute ripcord.

24 Claims, 23 Drawing Figures

PATENTED MAR 13 1973
3,720,390
SHEET 1 OF 7
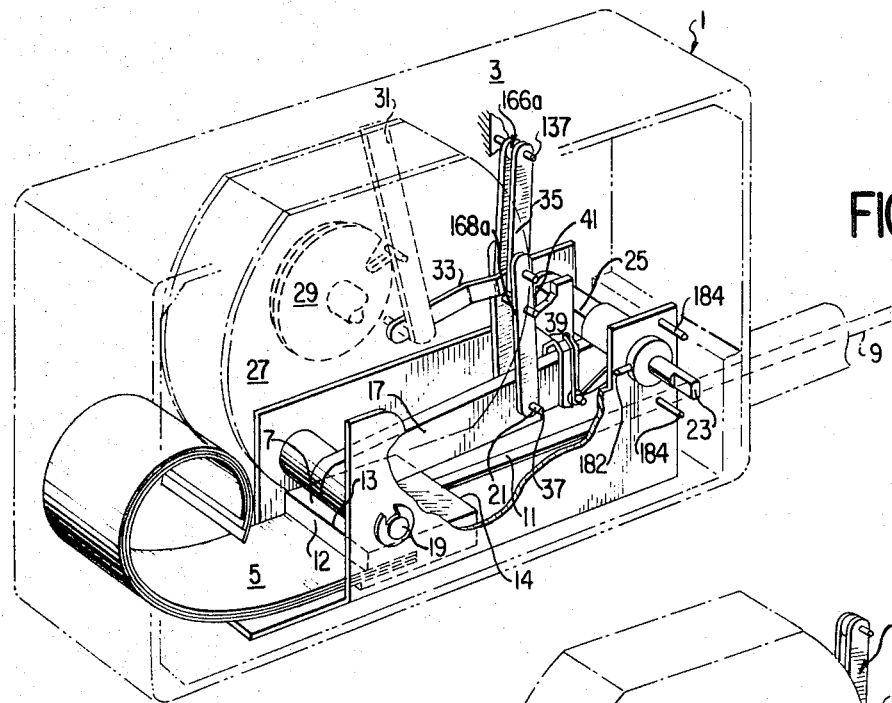
FIG.1
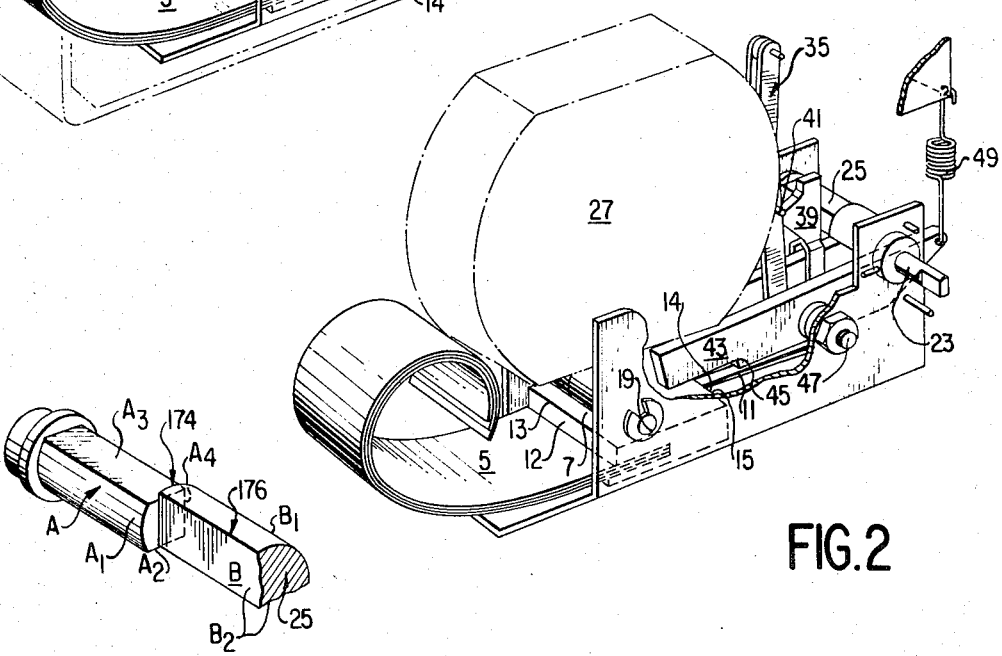
FIG.2
FIG.3

PATENTED MAR 13 1973 3,720,390

COCKING & FIRED
CONDITION - NO
TIME SET

COCKED CONDITION
TIME SET

SAFE CONDITION

ARM CONDITION

COCKING CONDITION

SAFE & ARM CONDITIONS

PARACHUTE RELEASE DEVICE AND METHOD

BACKGROUND OF THE INVENTION

The present invention relates to an automatic parachute release device, and more particularly to a device of this type having a delayed releasing mechanism and providing for interrelated safety features to prevent premature parachute release.

Various parachute release devices incorporating either timers or barometric releases as well as the combination of the two have long been known. Such devices typically utilize a coil spring securely mounted to a circular piston which in turn is permanently fastened to a release cable. Another often used feature involves a spring biased pulley assembly mounted to a release cable so that the pulley assembly, upon release, rotatably coils the cable about its periphery. It can be appreciated that the parachutist's life may depend on the proper operation of a mechanism of this sort. To this end, the prior art devices have employed various complicated mechanisms utilizing precision linkages and excessively large springs to attempt to obtain a proper "safety factor" to insure release.

Incorporation of a large spring and heavy duty latching mechanisms as well as precision gearing and timers may make the cost of the automatic release mechanism prohibitive, particularly to those who jump for sport or who are occasional users of parachute mechanisms.

With increasing interest being generated in parachuting over the past several years it would be desirable to provide a mechanism which is both functionally sound and inexpensive.

In prior art devices a coil spring, responding to Hook's law, would provide a large amount of force as it was first retracting, with the force diminishing until the spring reached its relaxed position. To obtain the proper releasing force, excessively large springs are often relied upon to insure that the proper pulling force would be applied at the end of the spring stroke. For example, a sixty-pound spring might be employed to provide ten to twenty pounds as the spring approaches its relaxed position. It may also be noted that excessively large release forces during a portion of the spring stroke occasionally might damage the parachute assembly or the parachute itself.

It would, therefore, be extremely desirable to provide a parachute release device wherein application of the releasing force applied to the ripcord could be effectively maintained over the entire spring travel without the need for excessively large springs or spring forces.

Some previous devices have employed circular piston assemblies wherein a locking member would latch against the edge of the cylindrical piston to hold the piston until a releasing condition occurred within the mechanism controls. The power spring was secured to one end of the cylindrical piston with the release cable extending from the other end. However, a cylindrical piston may sometimes prove difficult to hold when the mechanism is in its cocked position. It can be appreciated that the surface upon which a locking mechanism is to operate would be quite small when utilizing the cooperation of curved surfaces. Jarring and vibrating the device could cause the latching mechanisms to slip off the piston edge and cause the prior art devices to release prematurely. Unstable locking of a cylindrical type piston may contribute in large part to the prior art pre-release problem.

It would, therefore, be highly desirable to provide a slidable release assembly wherein a positive latching and locking control is provided so as to militate against premature release.

Another disadvantage of the prior art release mechanisms was the lack of any related safety features which could be effectively operated by the parachutist to control his period of free fall. After leaving the aircraft and during free fall descent, there was little a parachutist could do to control the release of the parachute once its release device was set. Because of variations in wind velocity and the position of various obstacles on the ground, it may be advantageous for a parachutist to be able to intelligently over-ride a preset parachute release condition. It may also be advantageous to over-ride the release condition entirely or merely postpone it for a measured length of time. Prior art devices have not provided any easily accessible and efficient solution to such problems.

It would, therefore, be desirable to provide a parachute release device wherein interrelated controls are provided for selective activation, deactivation, and postponement of release initiating forces.

Additionally, the aircraft carrying the parachutist is often subjected to severe turbulance and vibrational stresses. Jostling about in the aircraft and hitting the aircraft bulk-heads often may be enough to set off the mechanism and release the parachute. Also, upon leaving or getting set to leave the aircraft many obstacles are encountered within the door frame itself which interfere with the free movement of the parachutist. Even the most rugged mechanism under these severe conditions could cause a premature release.

It would, therefore, be desirable to incorporate a function control assembly wherein a safe condition may be set positively locking the mechanism from release under any such conditions.

It would also be desirable to provide an intermediate armed position wherein the device is releasable upon leaving the aircraft but is internally supported to prevent its premature release due to vibration or shock.

Timer mechanisms used as delayed releasing means on prior art devices were usually setable from zero to approximately ten seconds, after a pin was pulled from the device, upon leaving the aircraft. With the increasing popularity of parachute skydiving extended periods of time are desirable for free-fall maneuvering. Any increased interval of time provided, however, must insure release of the device regardless of the parachutist's condition or the positiOn of his body. This is especially the case should the parachutist pass out or be injured while leaving the aircraft.

It would, therefore, be desirable to provide a long time delay mechanism which incorporates positive safety features for insuring parachute release and for providing ample maneuvering time.

OBJECTS AND SUMMARY OF THE INVENTION

It is, therefore, a general object of the invention to provide a parachute release device which obviates or minimizes disadvantages of the sort previously noted.

It is a particular object of the invention to provide an improved parachute release device having a releasing force spring which effectively maintains a substantially constant releasing force over the entire spring return so as to avoid the need for excessively large springs or spring forces.

It is a further object of the invention to provide a parachute release device which utilizes a positively engageable slide assembly for transmitting releasing forces.

It is another object of the invention to provide a slide assembly having independently engageable surfaces for locking an armed device and for selectively controlling its activation.

It is a related object of the invention to provide interrelated controls for utmost flexibility and to insure safe operation.

It is yet another object to provide a lockable release mechanism for positively preventing parachute release.

It is a related object of the invention to provide an internally supported releasing assembly for preventing premature vibrational release.

It is yet another object of the invention to provide in a parachute release device, a reliable delayed releasing means capable of being set for providing relatively long time delays.

It is still another object of the invention to provide a novel method of pulling a parachute ripcord to release a parachute.

A preferred embodiment of the invention intended to accomplish at least some of the foregoing objects comprises a parachute releasing device for pulling a parachute ripcord to release the parachute, and including slidable release means slidably movable between a cocked position and retracted parachute release position. The slidable release means is operable to exert a pulling force on the parachute ripcord and is comprised of a generally longitudinally movable slide block having a cam engageable releasing edge and a cam engageable retaining edge adjacent opposite ends thereof. The releasing end and retaining end are defined by intersecting, generally planar surfaces.

For selectably and releasably retaining the slidable release means in a cocked position, a cocking cam means is provided. The cocking cam means is comprised of a sear, pivotally mounted for rotation about a pivot axis extending generally transversely of, and offset from, the longitudinal path of movement of the slide block. Included in the sear is a notch selectably engageable with and disengageable from the cam engageable releasing edge upon movement of the slide block to the cocked position.

Movement of the slidable release means to the cocked position is selectively prevented by a blocking cam means comprised of a blocking cam lever. This blocking lever is pivotally mounted about a pivotal axis also extending generally transversely of and offset from the path of movement of the slide block. The blocking lever includes a blocking portion cooperable with the cam engageable retaining edge of the slide block.

Sear biasing means is provided for normally biasing the sear toward a pivoted position for releasable engagement between the notch and the cam engageable releasing edge. The blocking lever is normally biased toward a pivoted position wherein its blocking portion is interposed in the path of movement of the slide block. This interposition prevents movement of the slidable releasing means to the cocked position by engagement between the blocking portion of the lever and the cam engageable retaining edge of the slide block.

Power spring means is provided for biasing the release means toward its retracted, release position. The power spring means is preferably comprised of a substantially constant force power spring connected to the slide block adjacent the block end having the cam engageable releasing edge. The power spring is movable between a stressed position, upon movement of the slidable release means to the cocked position, and a biased relaxed position, upon disengagement of the sear notch from the cam engageable releasing edge. Preferably, the substantially constant force power spring is comprised of one or more substantially planar spring elements operable to pull the slidable release means to its retracted, released position upon movement of the spring to its relaxed position.

Movement of the slidable release means from its retracted position to the cocked position is accomplished by cocking means. This cocking means may be comprised of a power shaft means connected to the slide block, and a bowden cable assembly including a bowden cable operatively connected to the power shaft means and a hook assembly. The power shaft means is connected to the slide block adjacent the end having the cam engageable retaining edge. The hook assembly is slidably engageable with the parachute ripcord and functions to ultimately pull the ripcord upon retraction of the extensible bowden cable.

For disengaging the sear notch from the cam engageable retaining edge, a delayed releasing means is provided. Preferably, this delayed releasing means is operative on a time delay basis upon the expiration of a selected period of time. However, other delayed releasing means, such as barometric pressure releasing means, may be additionally or alternatively provided.

The time delayed releasing means includes a movable timer member, preferably a lever mounted for movement between a time set position and timed out position. Timer member biasing means biases the timer lever toward said timed-out position. However, timer cam means is provided for controlling movement of the timer member between the time set position and the timed-out position.

Disengagement of the cocking cam means to release the slidable release means by operatively coupling the timer member to the cocking cam means is provided by a linkage means. The linkage means is comprised of an extensible and contractable link assembly, including sear control linkage means pinned in a slot of the sear. This slot extends generally transversely of the path of movement of the slide block and generally transversely of the sear pivot axis. The linkage means also includes a linkage assembly extending and retracting link means, pivotally pinned to the linkage assembly and connected to the timer lever.

Upon movement of the biased timer lever to a timed-out position, this link means is operable to collapse the linkage assembly to move the sear away from its biased pivoted position through the cooperation of the sear control link means and slot on the sear. Upon movement of the biased timer member to a time set position, the link means is operative to extend the linkage assembly and reorient the sear control link means pin relative to the sear slot. This reorientation permits the sear biasing means to resiliently urge the sear toward its biased pivoted position.

Stop means is provided for normally disabling operation of the delay releasing means and for permitting such operation upon a predetermined condition. Wherein the delayed releasing means is a timer, the stop means is a timer stop means comprised of a stop pin assembly. This assembly includes pull pin means movable between a first position for disabling the time delay means and a second position for permitting time-out of the time delay means. Also included in the stop pin assembly, is a manually operable auxiliary stop means. This auxiliary stop means is biased to a first position for permitting time-out of the time delay means, and is selectively manually movable to a second position for disabling the time delay means for a desired period of time even when the pull pin means is in its second or enabling position.

The release device is provided with function control means movable to a COCK position, a SAFE position and an ARM position. The function control means includes first means cooperable with the blocking cam means to permit cocking of the slidable release means only when the function control is set in the COCK position. Such cocking movement is precluded with the function set in SAFE or ARM positions. Second means is cooperable with the cocking cam means to permit cocking movement of the slidable release means when the function control means is in the COCK position. However, this second means positively locks the cocking cam means from releasing the slidable release means when the function control means is in the SAFE position. This locking is accomplished regardless of time-out of the timed delay means.

The function control means also includes third means cooperable with the linkage assembly when it is in an extended position, to stabilize the linkage assembly against substantial displacement. Collapse of the extended linkage assembly is, however, permitted upon time-out of the time delay means.

The third means includes a safety latch pivotally mounted on the sear and biased toward a retracted position. However, the safety latch is movable to an operative position wherein a safety recess generally surrounds and engages a pin on the linkage assembly to effect its stabilization in the extended position.

Preferably the above identified first, second and third means comprise an integrated function cam. This function cam includes: camming means for selectably moving the safety latch to its linkage buttress position; camming means for selectably maintaining the blocking lever in its blocking position; and camming means for selectably maintaining the sear notch in locked engagement with the releasing edge of the slide block. These camming means are related to one another so that movement of a single control knob to either the COCK, SAFE or ARM position automatically establishes correct camming means operation.

THE DRAWINGS

Other objects and advantages of the present invention will become apparent from the subsequent detailed description thereof in connection with the accompanying drawings in which like numerals designate like elements, and in which:

FIG. 1 is a perspective view of the parachute release device of the invention illustrating the function control assembly and related sear latch;

FIG. 2 is a perspective view of the slide lock latch of the invention for controlling the cocking thereof;

FIG. 3 is a perspective view of a multi-sectional cam utilizable according to the invention for controlling the latching mechanisms;

DETAILED DESCRIPTION

General Summary

Figure 4:
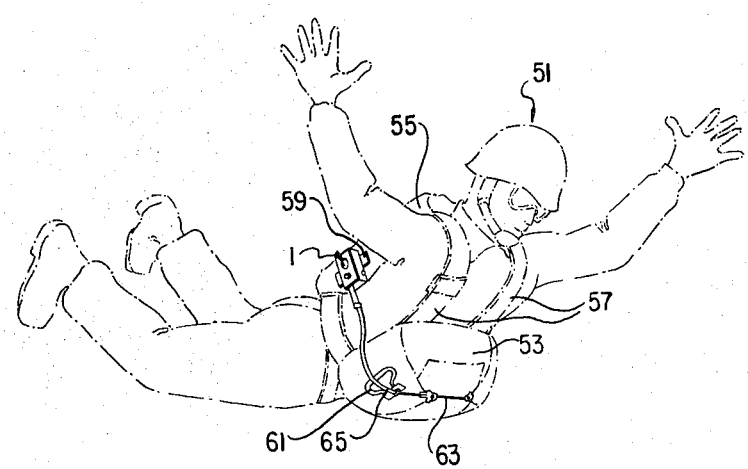
FIG. 4 is a view of a parachutist in free fall with a parachute release device, according to the present invention, mounted on the parachutist's backpack.

Referring now to FIGS. 1 and 2, a preferred form of a parachute release device 1 of the present invention is there shown.

The release device 1 includes a housing 3 within which is slidably mounted a power spring means 5 that forms a compact power source used to ultimately provide release of the parachute. As hereinafter more fully described, the spring provides a substantially constant force throughout its stroke between a cocked position and a relaxed position.

In FIG. 1, the power spring is illustrated in transit toward its cocked position. Movement of the spring 5 to that cocked position is accomplished through movement of a slidable release means, or slide block 7. It will be appreciated that the spring 5 and the slide block 7 are securely coupled so that movement of one will positively move the other by a related distance. Thus, with the spring in a cocked position, upon release of the slide block, the spring will return to its rest position and move the slide block 7 while doing so.

The slide block 7 is connected to a parachute ripcord (not shown in FIGS. 1 and 2) by means of a power shaft 11 and a bowden cable 9. Thus, upon return movement of the spring 5 and the slide block 7, the parachute ripcord will be pulled outwardly from a parachute pack by the bowden cable 9, and will function, in a conventional manner, to free the parachute and permit its opening.

For the purpose of providing for positive holding and release of the slide block 7, at desired times, the slide block 7 is equipped with two substantially planar, and generally sharp edged control surfaces 12 and 14. These surfaces 12 and 14 are disposed generally parallel to one another, and one functions to provide a cam engageable releasing edge 13 while the other provides a cam engageable retaining edge 15. The operation of locks and latches in cooperation with these edges 13 and 15 as hereinafter more fully described, thus provides positive control over the release and cocking of the power spring 5.

According to the present invention, various interrelated safety features are effectively incorporated to insure or retard release through control of the slide block 7. One such feature contemplates prevention of the cocking of the spring 5 in the absence of predetermined conditions.

As illustrated in FIG. 1, a retaining cam means or sear 17 is pivotally mounted about a pivot pin 19. The sear 17 includes a notched portion 21 which is selectively and lockably engageable with the cam engageable releasing edge 13 of the slide block 7. Such engagement is operative to hold the slide block 7, and therefore the power spring means 5, in the biased or cocked position. Whether or not the sear 17 may be maintained lockably engaged with the slide block 7 is determined by the appropriate and selectable orientation of a control position on a releasing control means 23.

This control means 23 in turn is operative to orientate a cam 25, shown in detail in FIG. 3. As hereinafter more fully described, the cam 25 may function to move the sear 17 about its pivot 19. Four operative cam surfaces of the cam 25 cooperate with sear 17 to control the release of the power spring 5 through control of the slide block 7, in a manner which will subsequently become apparent.

Additional control of the sear 17 is provided by a delayed releasing means, which in the preferred embodiment is a timer 27. This timer 27 operates through a cam assembly 29 and a linkage assembly 31 to supply a release initiating stroke to the sear 17 through an offset linkage arm 33. The linkage arm 33 is coupled to a generally vertically extending linkage assembly 35.

Details of these cam and linkage assemblies are hereinafter more fully described. However, it may be presently noted that lateral movement of the linkage arm 33 is operative to centrally retract the vertical linkage assembly 35. This retraction in turn produces an upwardly acting force on the sear 17 through a pin 37.

The cooperation and interaction of the delayed releasing means 27 and the release control means 23 will subsequently become apparent. Presently, it should be pointed out that these controls 27 and 23, are structurally interrelated to provide both positive control and safe operation.

In order to militate against premature release of a cocked power spring 5, an arming or safety lock 39 is provided. This safety lock 39 is pivotally mounted on the sear 17 and is also controlled by the previously identified cam 25. In this fashion, the safety lock 39 may be selectively pivoted, by appropriate selection of a position of the control means 23, to a support position cooperating with a pin 41 of the vertical linkage assembly 35. In this position, vibrations which might otherwise produce release are protected against, as hereinafter elaborated.

With reference to FIG. 2, an understanding may be gained of the general operation of a retaining cam means or slide lock 43 selectively operable to prevent or permit cocking of the power spring 5. The slide lock 43 is pivotable about a pin 47 and is cooperable with the cam engageable retaining edge 15 of slide block 7 by means of a notch 45 to selectively prevent such cocking. Normally the slide lock 43 is biased by a coil spring 49 to place the notch 45 in a blocking position with respect to the slide block 7. However, the release control means 23 is positionable in a cock position to cause the control cam 25 to pivot the slide lock 43 in a non-blocking position out of the path of block 7 when the power spring 5 is to be cocked. As will become apparent, the need for positioning the release control means 23 in a cocked position avoids the possibility of damage to portions of the release device 1 through attempts to cock in other positions of the control means 23.

Detailed Structure and Operation

FIG. 4 illustrates a parachutist 51 with his arms and legs extended in a free fall position. A conventional chest pack 53 and a conventional back pack 55 are mounted on a pair of straps 57 in the usual manner. The parachute release device 1, according to the present invention, is mounted on the parachutist's back pack by means of a bracket 59. A conventional parachute hand-operated D-ring 61, which operates the parachute ripcord 63, is shown on the chest pack 53, behind a cable assembly 65. This cable assembly 65 leads to the parachute ripcord 63 and is operable to exert a parachute releasing force thereon.

Figure 5:
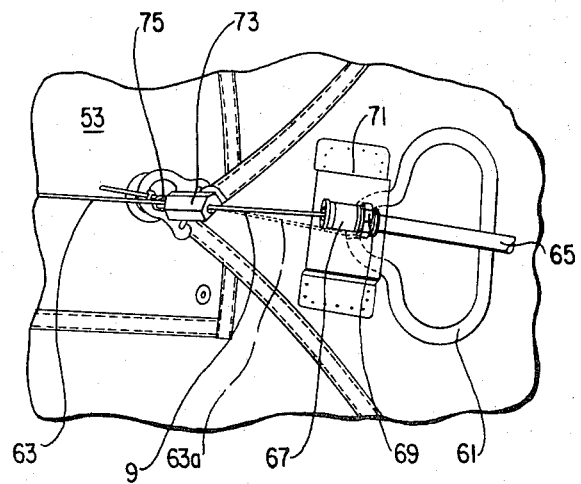
FIG. 5 is a detailed view of the mounting bracket on a chest pack interconnecting the release device cable and the parachute ripcord.

In FIG. 5 details of the mounting of the cable assembly 65 and associated elements attached to the chest pack 53 may be seen. The mounting arrangement illustrated in FIG. 5 shows how the parachute release device 1 may be operatively connected to a parachute ripcord 63, while still permitting the parachutist to override the release device 1 and pull the hand operated D-ring 61 to manually release the parachute. For convenience of illustration, FIG. 5 is oriented 180° out of phase with the FIG. 4 orientation.

The cable assembly 65, as illustrated, is provided with a ripcord hook housing 67 and cable support bracket 69, detachably connected to a mounting plate 71 on the chest pack 53. The previously identified bowden cable 9 extends from the hook housing 67 to a ripcord hook assembly 73 having a hooked end 75. This hooked end 75 is disposed about and slidably receives the ripcord 63.

When the parachute release device 1 is uncocked, its power spring 5 is in the relaxed or unbiased position, as has been discussed, and the bowden cable 9 is in a retracted position. When cocking the mechanism, the power spring 5 is uncoiled by pulling the bowden cable 9 to an extended position. The force exerted on the bowden cable 9 causes cocking of the spring 5 through movement of the slide block 7.

Figure 7:
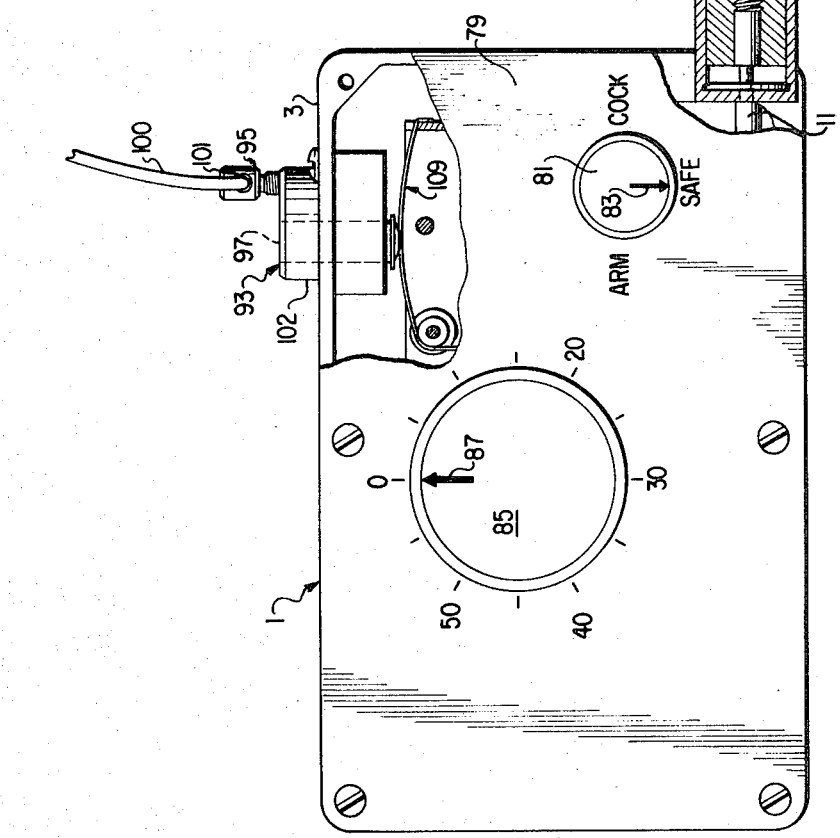
FIG. 7 is a front elevational view of the parachute release device illustrating the control knobs and details of the release cable utilizable with the invention.
Figure 9:
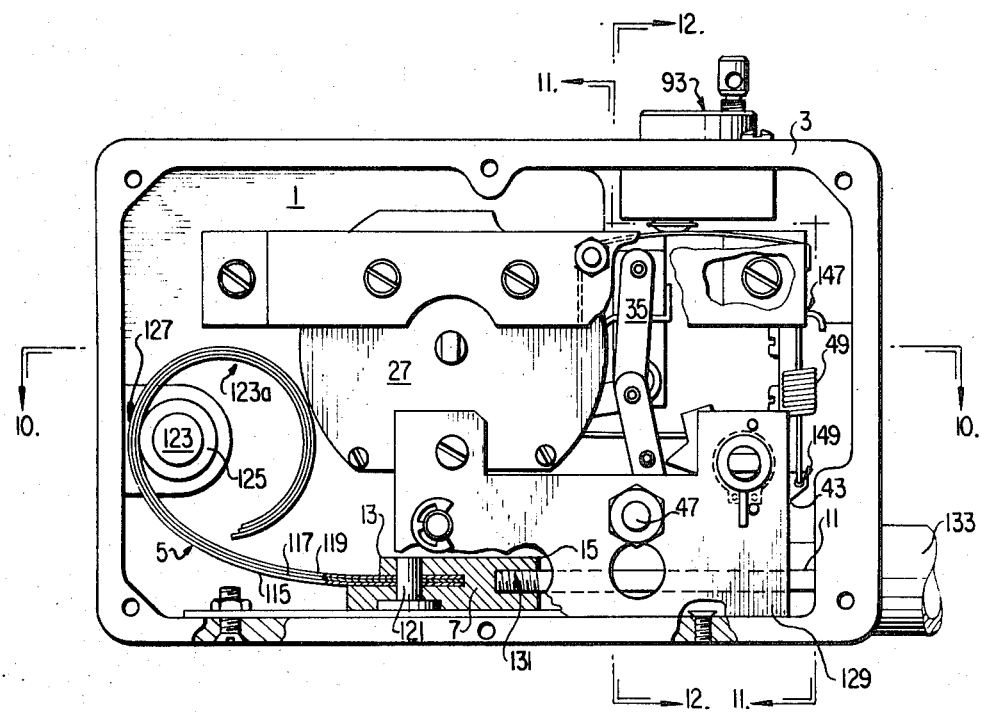
FIG. 9 is a front elevational view of the release device of the invention with the cover removed therefrom and illustrating the location and interrelation of the linkages and latches.
Figure 10:
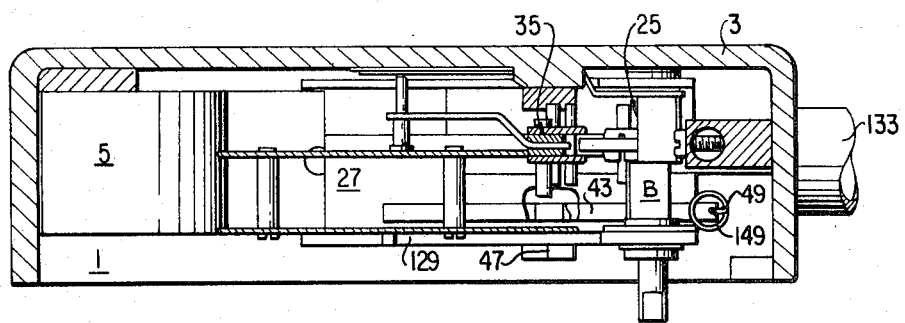
FIG. 10 is a cross-sectional view of the parachute release device of the invention and taken along lines 10—10 of FIG. 9.
Figure 11:
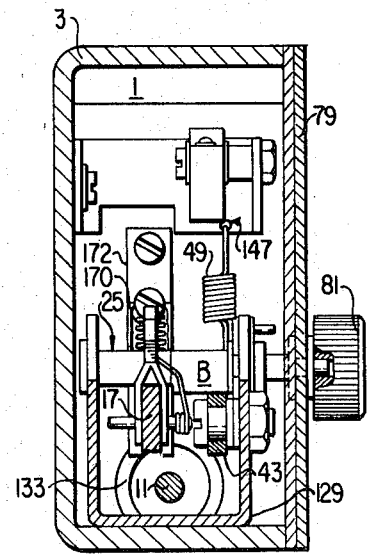
FIG. 11 is a cross-sectional view of the parachute release device of the invention and taken along lines 11—11 of FIG. 9.
Figure 12:
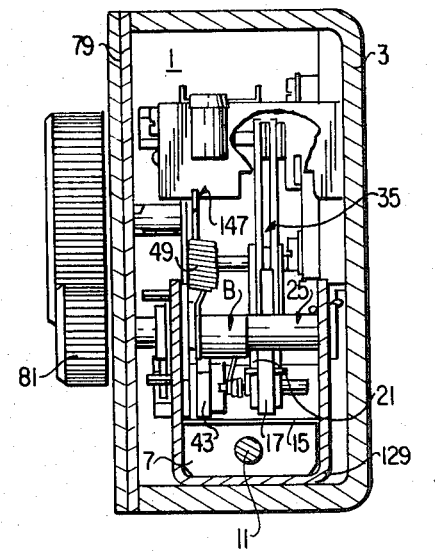
FIG. 12 is a cross-sectional view of the parachute release device of the invention and taken along lines 12—12 of FIG. 9.

As shown in FIG. 7, when the release device 1 is uncocked, the ripcord hook assembly 73 is held in abutment with the ripcord hook housing 67 by the retracted bowden cable 9. However, when the device is cocked, the extended bowden cable 9 and the hook assembly 73 project beyond the hook housing 67, as is shown in FIG. 5.

With the ripcord 63 disposed within (i.e., looped through) the hooked end 75 of the hook assembly 73, retracting longitudinal movement of the bowden cable 9 toward the release device housing 3 will release the parachute by pulling the ripcord, with the actual parachute release occurring in a conventional manner.

The looping of the ripcord 63 through the hooked end 75 is such as not to interfere with normal operation of the D-ring 61, which may be used at any time to release the ripcord 63 and override the parachute release device 1. The D-ring 61 is also suitably connected, in a conventional manner, to the ripcord 63, as shown in phantom at 63a in FIG. 5.

Although FIGS. 4 and 5 show one mounting orientation of the cocked release device 1 according to the invention, it is with in the contemplation of the invention to position the cocked release device 1 in any convenient location (and by any suitable mounting), such as on any one of the parachute packs or harnesses normally carried by the parachutist. For example, the cocked release device 1 may be mounted on the back pack 55 (FIG. 1) or on any other safety parachute. It is also within the contemplation of the invention to locate the cable assembly on any one of the parachute packs, thereby making the parachute release device 1, operative on any such pack.

Figure 6:
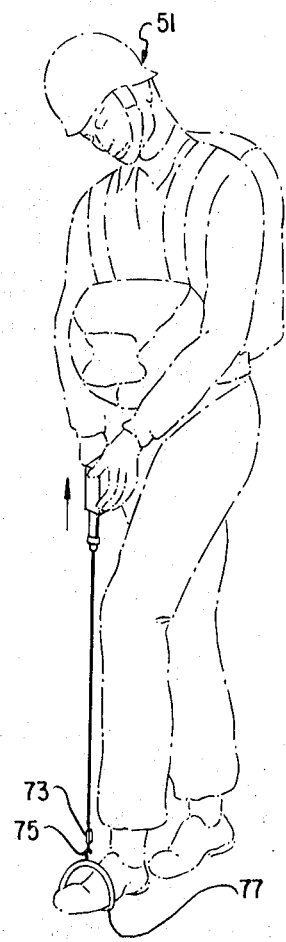
FIG. 6 shows the cocking of the parachute release device by means of a cocking handle, prior to mounting of the device on the backpack.

FIG. 6 illustrates one technique by which the parachute release device 1 according to the present invention may be cocked prior to final mounting and connection with the ripcord 63. In this technique, the parachutist 51 may place his foot through a cocking handle 77 suitably attached to the hooked end 75 of the hook assembly 73. The parachute release mechanism 1 may then be pulled upwardly until the slide block 7 latches and the spring attains its cocked condition.

It should be appreciated that the power spring 5 presents a substantial force which must be overcome when cocking the release device 1. However, the force required to cock the release device 1 is substantially less than that required by prior art devices designed to supply an initial retracting force significant in excess of the required final retracting force. As has been previously pointed out, the spring 5 of the present invention is designed to provide a substantially constant retracting force throughout its entire retracting movement.

Although FIG. 6 illustrates a foot controlled cocking technique, it will be apparent that a hand controlled or other suitable technique will serve a similar purpose. However, since the force necessary to cock the release device of the preferred embodiment is approximately 25-27 lbs., the foot controlled cocking technique is advantageous.

Prior to cocking, the proper orientation of the previously identified control means 23 is required. This orientation is obtained by means of a rotatable control knob 81 extending through a cover 79 of the housing 3, as may be seen in FIG. 7. This control knob 81 is suitably connected to the control means to facilitate rotation thereof to three control positions for controlling the release or cocking of the mechanism 1. To this end, the control knob 81 is provided with an indicator means 83 cooperable with three position indications (designated ARM, SAFE and COCK) provided on the cover 79.

The cover 79 also has indicia representative of time increments from zero to 60 seconds, clearly marked thereon as shown in FIG. 7. A knob 85 which controls the previously identified timer 27 has an indicator 87 thereon for registering an appropriate time interval after which the release mechanism 1 will be caused to operate. As in the case of the control knob 81, the time indicating knob is operably accessible from the outside of the release device 1.

With continued reference to FIG. 7, the previously identified cable assembly 65 may be seen as partially broken away to illustrate the operative connection between the power spring controlled bowden cable 9 and the hooked end 75 which functions to cause pulling of the ripcord. The bowden cable 9 is slidably disposed within a flexible sheath 89 and is fixedly secured to a collar 91 slidable within a tube 133, as indicated by the threaded connection illustrated at 91a. The collar 91 is also fixed to the previously noted power shaft 11 coupled to the spring controlled slide block 7 (FIG. 1). It will be appreciated that spring movement is thus transmitted to the hooked end 75 through the bowden cable 9.

After the cocking of the parachute release device 1, the hooked end 75 is slidably disposed about the ripcord 63. The hooked end 75 is releasably anchored within a fitting 74 having a hook retaining slot 74a therein. The fitting 74, with hooked end 75 retained therein may be unscrewed from the hook assembly 73 by utilizing the screw threads 73a. Then the hook 75 may be placed about the ripcord 63, and then screwed back into the assembly 73 until the fitting is captured in the threads 73a of the assembly 73. Any slack should be eliminated when screwing in the fitting 74 carrying the hooked end 75.

In order to facilitate adjustment of the hooked end 75 to insure operationally proper relationship with respect to the ripcord, the ripcord hook housing 67 is threadably received by means of the chute bracket 69, as indicated at 69a. Thus some longitudinal adjustment may be accomplished to compensate for dimensional differences between parachutes, as well as for the particular location of the release device 1 on the back pack 55 insofar as the amount of bending of the bowden cable will affect the adjustment. Before mounting on the bracket 71, as shown in FIG. 5, the adjustment to chute bracket 69 would generally be made. Once the proper operating distance has been determined and set, the chute bracket 69, by means of notches at 67b or similar mounting configurations, would be interconnected with the bracket 71 (FIG. 5). Additional length adjustments may be made by unscrewing the threaded fitting 74 that mates with the hooked end 75.

To reduce the effect of shock and vibration, a rubber bushing or resilient cushion 92 encircles the bowden cable as it leaves the hook housing 67 and serves to cushion the retraction of the assembly 73.

Such retraction is controlled by a stop mechanism 93. To provide for increased flexibility in controlling the release mechanism 1 of the invention, this stop mechanism is double acting and serves to initiate starting of the automatic timer 27, and to selectively override the operation of the timer. For these purposes, a static pin 95, and a manually operable auxiliary stop pin 97 are provided. The stop mechanism 93 is shown in FIG. 7, with the static pin 95 and auxiliary stop pin 97 extending from positions internally of the housing 3 to externally accessible locations.

Figure 8B:
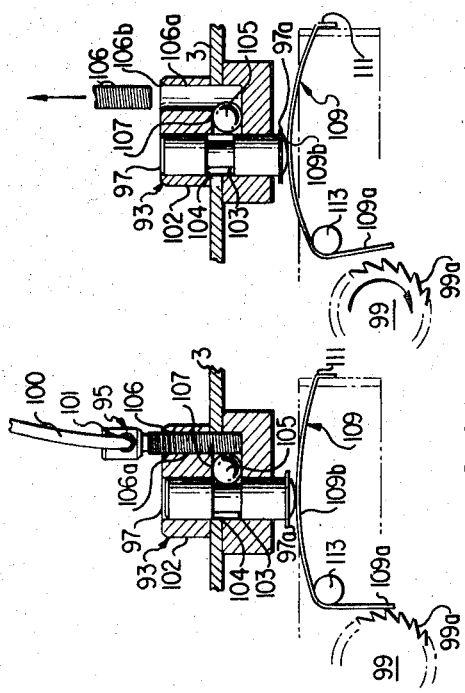
FIGS. 8a and 8b are detailed fragmented views of the pull-pin assembly of the invention in its stop and release positions.
Figure 8A:
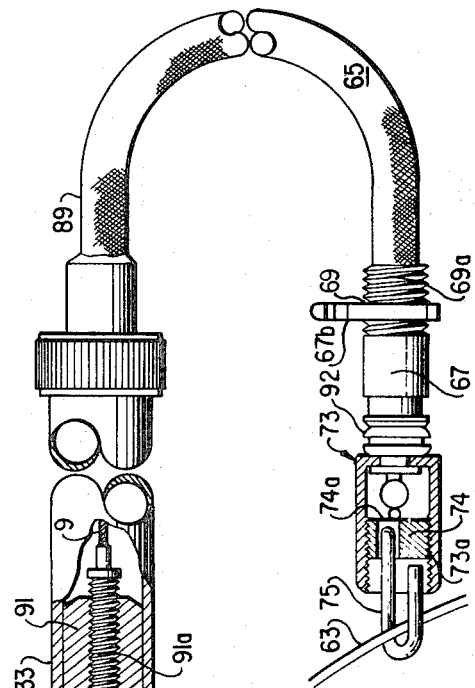

A timer utilized in the preferred embodiment of the invention is equipped with a rotatable stop member or wheel 99 best viewed in FIGS. 8a and 8b. This stop member 99 is caused to continually rotate during timer operation in the absence of any positive pressure applied to its generally toothed periphery 99a. This pressure causes the rotatable stop member 99 to remain stationary and to in turn stop the timer 27. The timer 27 may, however, be set whether or not such pressure is exerted, and may be set for additional time at any time.

Normally such pressure is applied by the static pin 95 in cooperation with the auxiliary pin 97 after the timer is set, but prior to the parachutist's jump. However, the static pin 95 is secured to a cable 100 by means of a pin aperture 101. The cable is also secured to the aircraft carrying the parachutist in any suitable manner so that upon the parachutist's departure, the static pin is pulled to release the pressure.

Once the pressure is released, the timer will count down unless the auxiliary stop 97 is manually depressed by the parachutist in free fall to again apply the stopping pressure to the timer wheel 99. This auxiliary safety feature allows the parachutist to override the timer 27 or delay its countdown depending upon weather or ground conditions being faced by the parachutist.

With continued reference to FIGS. 8a and 8b, it may be seen that the static pin assembly 93 includes a block unit 102 suitably secured to the housing 3 and projecting internally and externally thereof. The auxiliary stop member 97 is generally cylindrical and is slidably and rotatably received by a generally cylindrical channel 104 in the block 93. A generally central groove 103 about the auxiliary stop member 97 is sized to wedgingly receive a ball bearing 105.

The static pin 95 is disposed adjacent the auxiliary stop member 97 and is slidably and rotatably mounted in the block 102. The static pin 95 has a generally cylindrical shank portion 106 receivable within a generally cylindrical channel 106a. In the preferred embodiment the pin comprises a flexible, spring formed shank portion 106 that substantially conforms to the channel 106a. The mouth of the generally cylindrical channel 106a is generally belled, or outwardly flared as indicated at 106b. In this fashion, the flexible pin may be pulled at large angles up to ninety degrees from the axis of the channel 106a. Thus, when the pin is tied to the aircraft, as by the cable 100, removal may be accomplished even though the direction of pull can only be approximately controlled.

A slot or track 107 for receiving the ball bearing 105 is provided in the block 102. This slot 107 serves to interconnect the end of the static pin receiving channel 106a with a generally central portion of the auxiliary stop member receiving channel 104. It will be appreciated that the ball bearing 105 is provided with sufficient clearance within slot 107 to be able to freely move within the slot when unimpeded.

As can be seen in FIG. 8a, when the static pin 95 is within its receiving channel 106a, the ball bearing 105 is jammed leftwardly into the groove 103 of the auxiliary stop member 97. As the ball 105 is wedged into the groove 103, the stop 97 is urged downwardly by the wedging action of the ball 105 on the peripheral boundary of the groove 103. The nature of the normal, or up position of the auxiliary stop member 97 in its receiving channel 104 is such that the stop member groove 103 is disposed contiguous with the ball slot 107, but displaced slightly above the bottom wall of that slot by an amount sufficient to permit such wedging action.

A spring 109 is suitably secured within the housing 3, as indicated at 111. This spring is operative to bias the auxiliary stop member 97 toward its up position shown in FIG. 8b.

The spring 109 is generally L-shaped with its free leg 109a disposed about a pin 113 adjacent the teeth 99a of the timer stop wheel 99. The other leg 109b of the spring 109 is disposed beneath the auxiliary stop member receiving channel 104 and is normally biased upwardly to urge the auxiliary stop member 97 to its up position.

However, when the static pin 95 is inserted to wedge the auxiliary stop member downwardly, or when the auxiliary stop 97 is manually depressed against the bias of the spring 109, the upper spring leg 109b is generally flattened as shown in FIG. 8a. This causes the other spring leg 109a to pivot outwardly about the pin 113 against the timer stop wheel 99. The resulting pressure thus stops timer movement. When the static pin is removed, (FIG. 8b) the biased spring 109 returns to its relaxed position. This return causes the upward movement of the auxiliary stop member 97.

Such upward movement of the auxiliary stop member 97 forces the ball bearing 105 out of the groove 103 by camming action of the groove periphery against the ball 105. The stop member 99 is then free to rotate and the timer countdown may continue. By manually depressing stop 97 at any selected time, the free end of the spring 109 may again be caused to abut the timer wheel stop 99 to prevent timer operation for the period of time the depression is maintained. However, release of the auxiliary stop permits the timer function to continue.

The static pin assembly 93 thus provides a positive start upon removal of pin 95 and a manually operable override for temporarily stopping the timer at any point of the parachutist's free fall and for any desirable period. This convenience or safety feature is particularly useful when unexpected weather conditions may occur or if obstacles are presented which are desirably avoided.

For example, a jumper nearing the end of his timed free-fall period may experience an unexpected condition that would make it desirable to reach a lower altitude more rapidly. He could then stop the timer and free fall past his normal opening altitude of around 2000 feet to as low as 700 feet in order to pass as quickly to that lower altitude as possible. It is also possible that after a student jumper leaves the aircraft with timer set for 2000 feet on main parachute, he may panic and mistakenly pull the ripcord on a reserve parachute, opening it, for example, at 3000 feet. Since allowing the main parachute to subsequently open could be disastrous, he may override the timer with auxiliary stop member 97. It will also be appreciated that the main parachute can be prevented from opening by reinsertion of the static pin, assuming it is in the parachutist's possession, a possibility noted subsequently. Alternatively, the function control knob 81 can be turned to SAFE or the time set knob 85 can be set to maximum time and either held there or repeatedly reset so that it never reaches zero.

It will be appreciated that the ball 105 may be of a sufficient size to be precluded from passing through the static pin receiving channel 106a and of a size small enough to be placed in the slot 107 through the auxiliary stop pin receiving channel 104. The auxiliary stop pin is maintained in the channel 104 by the biased spring leg 109b and an enlarged washer 97a on the inner end of the member.

With particular reference now to FIGS. 9–12, details of various of the earlier noted sub-assemblies of the release mechanism 1 may be understood. The release mechanism 1 is illustrated in these FIGS. 9–12 in an uncocked position, i.e., spring 5 is in a relaxed or unbiased position within the housing 3. The housing cover 79 has been removed, for convenience, in FIGS. 9 and 10.

The Spring, Slide Block and Slide Lock

The spring 5 and the slide block 7, as previously mentioned, are secured together for unitized movement. The spring 5 imparts a substantially constant parachute releasing force to the ripcord through the connection of the slide block 7 to the power shaft 11. To this end, the power spring 5, as illustrated, comprises three laminated spring steel portions 115, 117 and 119 which are suitably secured within a slot in the slide block such as by means of a screw 121. These portions are generally constant torque, constant force, NEGATOR springs.

The spring steel portions are, in a relaxed state, generally coiled adjacent one end thereof as indicated at 123a. The coiled portions 123a are disposed about a bushing 125. Preferably this bushing 125 comprises a plastic sleeve rotatably mounted on a pin 123 which is suitably fixed within the housing 3. Sufficient space, indicated at 127, is provided between the bushing 125 and the housing wall to allow the spring 5 freedom of coiling or uncoiling movement during the cocking or release of the release device 1. It will be appreciated that during cocking, uncoiling movement of the spring is limited by travel of the slide block 7 to an amount preventing complete disengagement of the spring from the bushing 125.

The slide block 7 moves freely longitudinally within a generally U-shaped track 129 (FIGS. 11 and 12) which is fastened to the bottom of the housing 3. As has been previously discussed, the slide block 7 has generally vertically extending parallel end surfaces defining releasing and retaining edges 13 and 15.

The power shaft 11 is threadably secured within the slide block 7, as indicated at 131, and extends outwardly through a transition tube 133 (FIG. 11) secured to the housing and projecting outwardly thereof. The power shaft 11 is secured to the bowden cable 9 (not shown in FIG. 11) within the tube 133.

When the bowden cable 9 is pulled to cock the spring 5, the force is transmitted by the power shaft 11 to slidably move the slide block 7 within its track 129 whereupon the cam releasing edge 13 is latched by the sear 17. However, in order for such latching to be accomplished, the slide lock 43 must be upwardly rocked about the pivot pin 47 to allow the slide block 7 to be placed in its latching position.

Normally, the spring 49 attached to one end of the slide lock 43 biases the slide lock notch 45 (FIG. 2) into a blocking position with respect to the cam retaining edge 15 of the slide block 7. The spring 49 is suitably anchored within the housing 3, as indicated at 147 (FIG. 9), and hooked into the one end of the slide lock at 149.

The function control cam 25 is provided with one section B (see also FIG. 3), having an arcuate lobe B1 which is operative to rock the slide lock at location 151. Through the action of the semi-circular cam lobe B1, the notch 45 is upwardly urged, against bias of the spring 49, to a non-blocking position permitting the cocking of the device.

It will be appreciated that the relationship between the cam 25 and the slide lock 43 is preferably such that the cam section B1 moves the slide lock to a non-blocking position in the COCK position of the function control knob 81, (FIG. 7), but that in all other positions, flats B2 (FIG. 3) on the cam 25 permit the bias of the spring 49 to maintain the slide lock in a blocking position. This arrangement not only provides a reminder to the operator to correctly position the function control knob 81 prior to cocking, but also avoids damage to other elements of the release device by preventing cocking when that knob is in the SAFE or ARM position.

For a purpose hereinafter described, in the SAFE position, the sear 17 is positively constrained against movement so that an attempt to cock the device in that position would damage elements of the device since the sear must be pivoted to permit cocking. Moreover, similar damage might occur through attempted cocking in the ARM position, since the linkage assembly 35 coupled to the sear 17 is positively constrained against movement (to prevent unintended vibrational release) in the absence of a full count down of the timer 27.

The Timer and Associated Linkage and Cam Assemblies

The delayed releasing means or timer 27, when set (and in the absence of impedence to countdown movement through the action of the stop assembly 93) provides a release initiating stroke to the sear 17 when a zero condition is reached on the timer 27. The illustrated timer 27 may be a spring driven timing mechanism of the type available from M.H. Rhodes, Inc., 30 Bartholomew Avenue, Hartford, Connecticut as a "Mark-Time" 1900 Series device. Such timers include the previously identified timer cam assembly 29 and the lever 31 which, through the linkage arm 33, is operative to control the collapsible retraction of the linkage assembly 35 operatively coupled to the sear 17, (FIG. 1).

To set the timer, the timer control knob 85 (FIG. 7), attached to a timer shaft 85a is rotated by a selected increment. This rotation causes rotation of the timer cam assembly 29 (FIG. 1) and sets the linkage assembly 35 in position to transmit the release initiating stroke to the sear 17 upon countdown of the timer 27.

With reference to FIG. 13 and FIGS. 19–22, the manner in which this is accomplished may be understood. For ease of understanding, it should be noted that FIGS. 19–21 constitute a rear view of the timer 27 as compared to its FIG. 1 orientation where the cam assembly 29 and lever 31 are shown in phantom, and that the cam assembly 29 and lever 31 are for the most part shown in full line in FIG. 13 insofar as the main body of the timer 27 is indicated in phantom.

The timer cam assembly 29 is comprised of two rotatable cams 153 and 155 superposed over one another and suitably maintained against axial separation. The outer cam 155 is directly coupled to a shaft 136 which carries the timer control knob 81 for rotation therewith; whereas, the inner cam 153 is rotatable with respect to that shaft 136. However, the body of the outer cam 155 is provided with a protrusion 155a cooperable with an arcuate groove 153a in the body of the inner cam 153. In this fashion, positive rotation of the outer cam 155 by rotation of the shaft 136, either during setting of the timer 27 or during timer countdown, causes driving of the inner cam 153 to rotate it in the same direction after the play between the projection 155a and the arcuate groove 153a is accomodated.

The cams 153 and 155 are each provided with generally V-shaped peripheral grooves, indicated at 153b and 155b respectively, and the play between the cam projection 155a and the arcuate groove 153a is such that these generally V-shaped grooves 153b and 155b always overlap one another to some extent. In the rest position of the timer, a follower 159 projecting from the timer lever 31 is seated in these grooves 153b and 155b.

A generally arcuate camming face 157 defines one boundary of the V-shaped groove 155b of the outer cam 155. This face 157 is cooperable with the lever projection or follower 159 to pivot the timer lever, outwardly of the V-shaped grooves 153b and 155b about its pivot axis 31a upon rotation of the outer cam 155 during setting of the timer 27. It will be appreciated that this cam rotation is counterclockwise as viewed in FIGS. 19–21 and clockwise as viewed in FIG. 13, with the angular pivoting direction of the timer lever being in the reverse angular direction.

Figure 20:
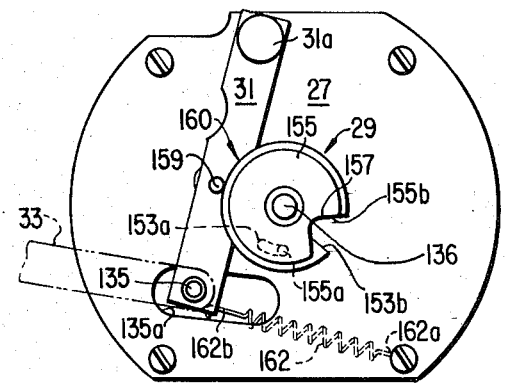
FIG. 20 is a front elevational view of the timer of FIG. 19 in its set condition.
Figure 21:
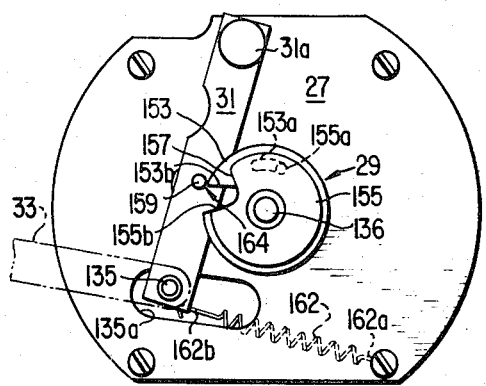
FIG. 21 is a front elevational view of the timer of FIG. 19 in its pre-release condition.

Since the inner cam 153 is of a diameter slightly exceeding the diameter of the outer cam 155 and since the inner cam is driven by the outer cam during such setting, the follower 159 is smoothly caused to slidably engage the outer, smooth and generally circular, periphery of the inner cam 153, as indicated at 160 in FIG. 20. Moreover, the follower 159 is actually biased into that slidable engagement by a coil spring 162 suitably attached to a fixed point in the timer and to the timer lever 31 adjacent its free end, as respectively indicated at 162a and 162b.

As will be apparent the amount of rotation of the cams of the cam assembly 29 determines the lapsed time setting of the timer by reason of the corresponding angular displacement of the generally V-shaped follower receiving grooves 153b and 155b. Of course, the V-shaped groove 155b of the outer cam 155 is angularly displaced by a greater amount during timer setting than that of the corresponding groove 153b of the inner cam 153. This occurs because of the play between the two cams noted above.

When the timer is permitted to time out by pulling of the stop pin 95 as discussed previously, the outer cam 155 is caused to reverse rotation toward its initial position, while driving the inner cam 153 therewith. Again, because of the play between the two cams 153 and 155, the V-shaped groove of the outer cam leads that of the inner cam in the return movement. As indicated at 164 (FIG. 21), the V-shaped groove 153b of the inner cam eventually returns to a position adjacent the lever follower 159. Further rotation of the cams thus results in positive and sharp-snapping of the lever 31 to its rest position under the biasing action of the coil spring 162 attached to the lever. The "snapping" type, sharp retraction of the lever is caused because of the permissible play between the two cams 153 and 155 and the steep radially aligned edge 153b.

This snapping retraction supplies the release initiating stroke to the sear 17 through the offset linkage arm 33 and the linkage assembly 35. Continued reference to FIGS. 13 and 19–21, as well as reference to FIG. 1, will facilitate understanding of this action.

One end of offset linkage arm 33 is suitably pivotally pinned directly to the timer lever 31 by means of a projection 135. Adjacent this projection 135 the timer housing may be slotted, as shown at 135a to receive an opposite projecting arm 135b (FIG. 22) to which the lever biasing coil spring 162 may be coupled. If desired, a similar slot 159a may be provided in the timer housing adjacent the lever follower 159 for receiving an inwardly projecting end 159b of that follower.

At its other end, the offset linkage arm 33 is pivotally pinned, as indicated at 139, directly to two linkage units 166 and 168 of the generally upright linkage assembly 35.

As best viewed in FIG. 1, these linkage units 166 and 168 are comprised of superposed link pairs 166a and 168a. One pair of links 166a is pivotally mounted adjacent the link ends on a fixed pin 137, while the other pair of links are fixed to the previously identified pin 21 operatively coupled to the sear 17 (see also FIG. 12). This latter pin 21 extends through an enlarged slot 21a in the sear 17.

The previously noted pin connection 139 between the offset linkage arm 33 and the generally upright linkage assembly 35 is also operative to pivotally couple the link units 166 and 168 together generally centrally of the linkage assembly 35. It will thus be apparent that the snapping retraction of the timer lever centrally collapses the linkage assembly 35 (leftward as viewed in FIG. 13) to sharply pivot the sear 17 about its pivot axis 19 by the action of the pin 21 in the sear slot 21a. At this time, the releasing edge 13 of the slide block 7 is disengaged from the sear 17 to permit the power spring 5 to pull the parachute ripcord.

It should be here noted that the relationship between the timer lever 31, the offset lever 33, the generally upright lever assembly 35 and the slot 21a in the sear 17 is such that the pin 21 is brought to its uppermost position at the top of the slot 21a and the sear 17 is held in a fully raised position when the timer is in its "Zero" or rest position, with the timer lever biased to the fully retracted position. Thus, although cocking movement of the slide block 7 is unimpeded when the timer is not set, in order to permit cocking of the release device 1, the timer must be set past its "Zero" position or the sear 17 will not be permitted to drop into latched position on the slide block 7.

As previously described, such setting of the timer pivots the timer lever out of the V-shaped cam notches. At the same time, the pinned connections between the various links cause the linkage to generally straighten (as shown in FIG. 14) and causes the pin 21 to assume a lower position relative to the sear pivot axis 19. At the same time the sear 17 is biased downwardly by a compression spring 170 acting against the free end of the sear 17. This spring 170 is schematically shown in FIGS. 13-17 and is fully shown in FIG. 11. The spring 170 is housed in a generally inverted U-shaped sear guide 172 that surrounds the free end of the sear 17, and acts between the top of the guide and the top of the sear.

The bias of the compression spring 170 pivots the sear 17 slightly about its axis 19 by an amount permitted through the lowering of the pin 21 upon straightening of the linkage assembly 35. This maintains the top of the slot 21a engaged with the pin 21. As a result the sear 17 may pivot upwardly, against the bias of the compression spring 170, when acted upon by the slide block 7 during cocking (in order to clear the way for slide block movement to cocked position). After the slide 7 clears the sear notch, the compression spring 170 pivots the sear to latch the cleared slide block 7. The downward pivotal latching motion of the sear brings the top of the slot 21a again into engagement with the pin 21 to ready the device for release of the slide block.

The Function Control Cam and Related Elements

As earlier discussed, the function cam 25 is provided with a first section B (FIG. 3) that cooperates with the slide lock 43 to maintain it in the correct blocking or non-blocking position in the various orientations (i.e., COCK, SAFE and ARM) of the control knob 81. The function cam 25 is also provided with a second cam section A that is operative to cooperate with the sear 17 and the previously identified safety lock 39.

The cam section B is comprised of the generally arcuate section B1 and the two flat surfaces B2 generally perpendicular to one another. Projecting longitudinally of the cam section and integral therewith is the cam section A. This section includes a generally flat surface A2 contiguous with one of the flat surfaces B2 of the other cam section B.

A parallel generally flat surface A3 (offset radially inwardly toward the axis of rotation of the cam 25 with respect to the arcuate cam surface B1 of the other cam section B, as indicated at 174) is also provided. Interconnecting one pair of ends of these two flat surfaces A2 and A3 and generally perpendicular thereto is a third generally flat surface A4. As indicated at 176, this surface is also offset with respect to the arcuate cam surface B1 of the other cam section B. The other pair of ends are interconnected by a fourth, generally arcuate cam surface A1, aligned with, but generally radially outwardly offset from an adjacent one of the flat surfaces B2 of the other cam section B.

Figure 17:
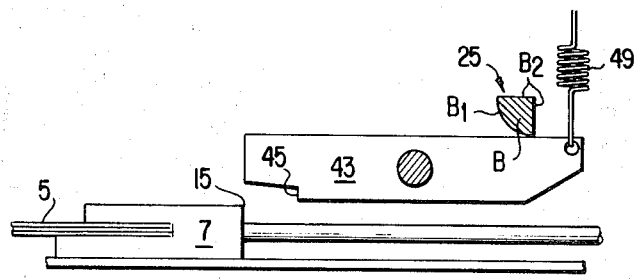
FIG. 17 is a front operational view of the cocking control assembly in its slide block non-abutting position.

With the function control knob 81 positioned in a COCK position, the contiguous flat surfaces A2 and B2 are faced generally upwardly. At the same time, the arcuate cam surface B1 of the B section of the cam 25, cams against the slide lock 43 to move that lock to a non-blocking position as shown in FIG. 17.

Figure 13:
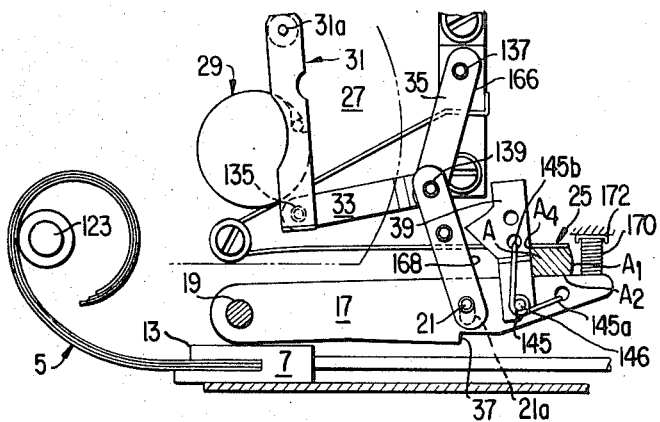
FIG. 13 is a front operational view of the latch for locking the spring assembly in its relaxed condition.
Figure 14:
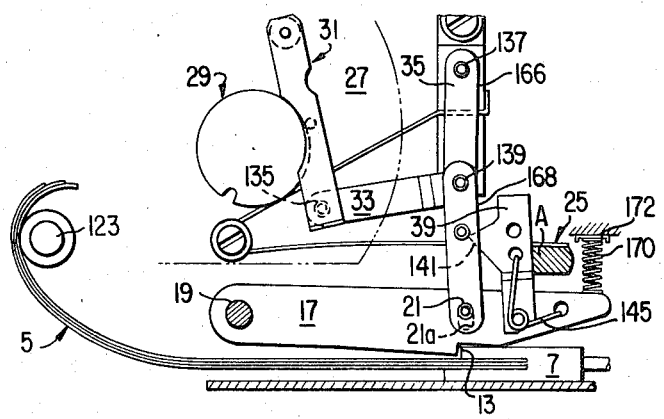
FIG. 14 is a front operational view of the locking mechanism having a retained cocked spring.

In this orientation of the function cam 25, the arcuate cam section A1 of the A portion of the cam faces away from the safety lock 39 as indicated in FIG. 13, while two of the flat sections A2 and A4 respectively engage the sear 17 and the safety lock 39. It will be appreciated that the sear is biased into engagement with one of these surfaces A2 by reason of the bias on the timer lever 31.

The safety lock 39, which is pivotally mounted on the sear 17, as indicated at 146, is biased into engagement with the other surface A4 by means of a torsion spring 145. This torsion spring 145 is suitably connected to the sear and to the safety lock 39, as illustrated at 145a and 145b.

Figure 15:
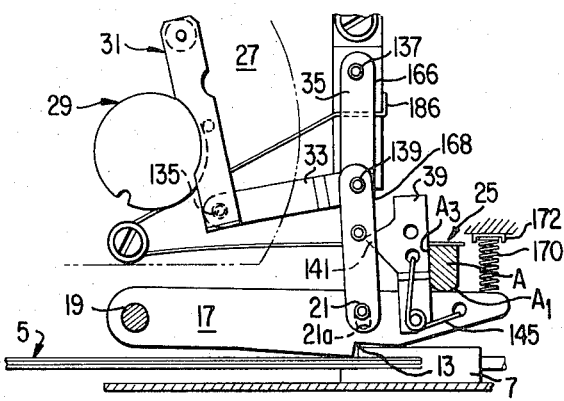
FIG. 15 is a front operational view of the locking mechanism wherein the slide block and associated power spring are prevented from release.
Figure 18:
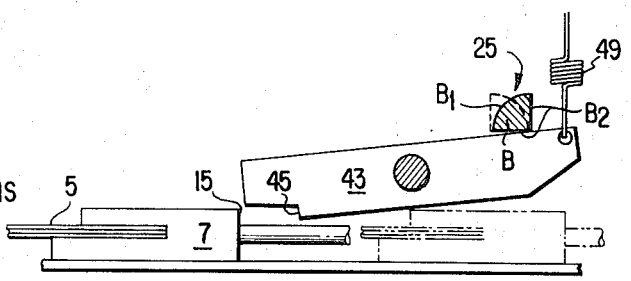
FIG. 18 is a front operational view of the cocking control assembly in its slide block abutting position.
Figure 19:
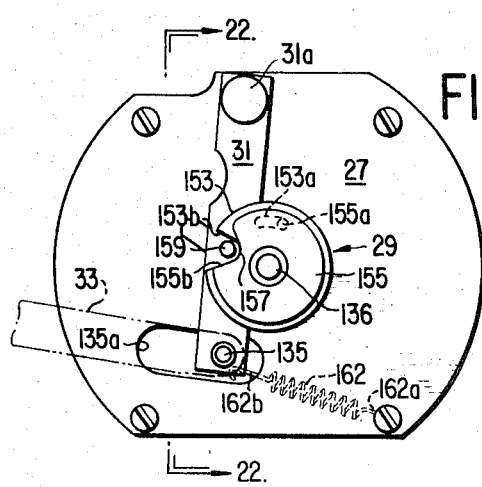
FIG. 19 is a front elevational view of a timer mechanism utilizable according to the invention as the delayed releasing means and its associated cam and linkage assembly.
Figure 22:
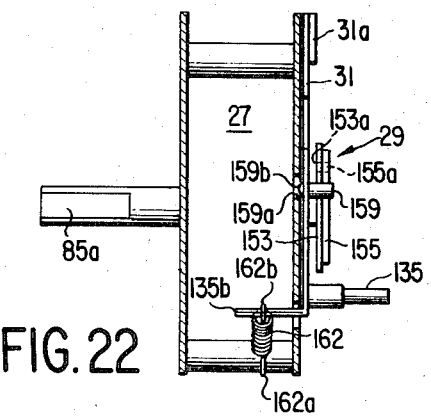
FIG. 22 is a cross-sectional view of the timer of FIG. 19 taken along lines 22—22 therein.

Clockwise rotation of the function control knob (as viewed in FIG. 7) by about 90° to the SAFE position reorients the cam 25. In that orientation, the arcuate section A1 of the one cam portion A positively urges the sear 17 downwardly about its pivot axis 19 and locks it against rotation, as shown in FIG. 15. Thus, in the SAFE position even complete countdown of the timer 27 will not release the slide block 7. In the SAFE position, one of the two parallel flat surfaces A3 of the A cam section engages the safety lock 39, with the safety lock thus being oriented in a generally retracted position. In order to prevent damage to the locked elements (i.e., the sear 17 and the cam portion A) through attempts to cock the release device when the function control knob is in the SAFE position, the slide lock 43 is maintained in a blocking position (FIG. 18). This blocking position is assumed because of the bias on the slide lock provided by the connected biasing spring 49, and is permitted insofar as the one of the flat sections B2 is positioned directly over the biased slide lock.

Figure 16:
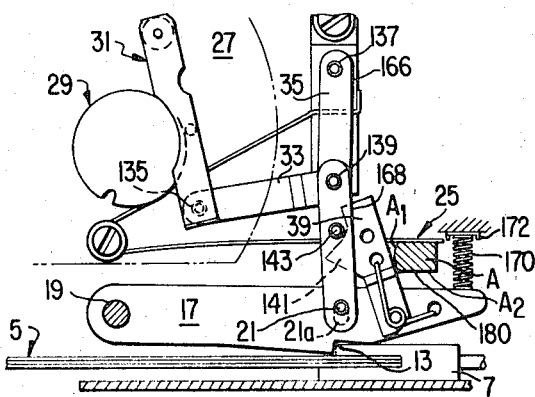
FIG. 16 is a front operational view of the locking assembly supported for preventing vibrational release.

Further clockwise rotation of the function control knob 81 by about 90 degrees to the ARM position again reorients the cam 25. In this orientation, the arcuate section A1 of the A cam section operates to pivot the safety lock 39 to its lock position (FIG. 16).

In this position, the safety lock is pivoted generally counterclockwise against the bias of the toggle spring 145. If the release device has been cocked, this pivoting places a locking recess 141 of the lock 39 in surrounding relationship to a fixed locking pin 143 interconnecting the lower links 168a of the lower linkage unit 168 of the linkage assembly 35. The surfaces of this recess 141 engage the locking pin to prevent any upward rightward lateral (as viewed in FIG. 16) movement of that linkage unit. Leftward lateral movement is prevented by reason of the extended position of the timer lever 31.

Thus, premature release of the slide block 7 due to vibrations or the like is militated against. However, retraction of the timer lever 31, after timer countdown, is permitted to raise the sear 17 to a release position, in the manner earlier described, since the flat cam section A2 is located above the sear, as shown at 180 in FIG. 16.

As will be apparent, damage to the safety lock 39 and a straightened linkage 35 (assuming the timer is set) through attempts to cock the release device 1 in the ARM position is prevented by the maintenance of the slide lock 43 in a blocking position through the other of the flat cam surfaces B2 of the B cam section (as shown in phantom in FIG. 18).

Although the cam sections A and B are preferably provided on the same cam member 25, in order to bring about correct relationships with respect to the sear 17 and slide lock 43 with a single orientation rotation of the function control knob 81, it will be apparent that separate cams may be provided. Moreover, if desired, the shaft 23 utilized to rotate the function cam 25 through the agency of the control knob 81 can be provided with a pin projection 182 (FIG. 1) cooperable with two suitably positioned stops 184 about 180° apart. In this fashion, rotation of the control knob 81 may be constrained to one hundred eighty degree rotation between the COCK, SAFE, and ARM positions.

The stops insure discrete positioning at the COCK and ARM positions. Such discrete positioning in the SAFE position may be enhanced by the cooperation of a suitable spring 186 (FIG. 15) with the flat surface A4 opposite the arcuate surface A1 of the A cam section. This spring 186 also serves, through cooperation with the A cam section, to resist angular displacement of the control knob 81 from the desired set orientation.

Summary of Operation of the Release Mechanism

The various sequence conditions of portions of the release device 1 embodying the present invention are more clearly illustrated in FIGS. 13–18, wherein the function settings are designated, and the corresponding positions of the slide lock 43, the sear 17, the linkage assembly 35 and the other elements are shown. In review, it may be noted that the slidable releasing means, or slide block 7 is, in the preferred embodiment, a rectangular steel member having the cam engageable releasing edge 13 and the cam engageable retaining edge 15. The releasing edge 13 is latched by a cam means, or cutout, 37 on the sear 17 when the device is cocked. The retaining edge 15 may be blocked by a blocking surface or notch 45, and will only allow cocking slidable movement of the slide block 7 when the function control is set to ARM.

FIG. 13 shows the release mechanism 1 in either a precocking or "fired" condition where no time is set on the timer 27. The power spring 5 is relaxed and coiled about the bushing 125. The sear 17 is shown in its uppermost pivotal position with the linkage assembly 35 retracted by the action of the biased timer lever 31. It is this retraction that moves the sear 17 to its uppermost pivot position against the bias of the compression spring 170. The orientation of the cam surface A2 permits such movement, and release of the cam retaining edge 13 by the sear notch 37.

FIG. 14 depicts the release device 1 in its cocked position. In this position, the timer has been set, thereby urging the follower pin 159 outwardly onto the arcuate periphery of the cam assembly 29 to ultimately position the linkage 35 in the illustrated, generally straight orientation. Unless the timer is set and the linkage assembly is so straightened, the bias on the timer lever 31 (tending to pivot the sear 17 upwardly) overcomes the bias of the compression spring 170 (tending to pivot the sear 17 downwardly) so that the notch 37 cannot latch against the cam retaining edge of the slide block when the slide block is pulled in an attempt to effect cocking.

However, with the timer set, the compression spring 170 is able to cause positive latching of the slide block by urging it downwardly after the retaining edge 13 of the block 7 is pulled beyond the sear notch 37. During the travel of the block 7 to that position, the sear is permitted to pivot upwardly and to accomodate the travel by reason of the slot 21a in which the now lowered pin 21 is received. Since the sear is also lowered by the compression spring (because the pin 21 is lowered when the linkage 35 is straightened), and since the function cam surface A2 has remained stationary, the sear will so pivot until latching of the block 7 is effected.

In FIG. 14, the locking recess 141 of the safety lock 39 is shown in a non-engaged position, being biased against the cam section A4 by the torsion spring 145. With the mechanism set in its cocked position and the function control knob at COCK, the entire assembly should be carefully handled to avoid release of the slide block since any excessive jarring or vibration may have the effect of retracting the sear 17. The release device may, however, be checked for proper operation in this condition although protection against shock or vibration is not afforded.

Such checking of course should be accomplished prior to the final assembly position of the release device 1 wherein the ripcord is passed through the hooked end 75 (FIG. 7), and may be readily accomplished by manually pulling the stop pin 95 (FIG. 8b). This permits the timer 27 to countdown and effect release of the slide block 7 even with the function control knob 81 at COCK position. After such release the power spring 5 will coil about the bushing 125 and effect a substantially constant force retraction of the slide block 7 to the position illustrated in FIG. 13.

FIG. 15 shows the release mechanism after cocking and with the function control knob 81 in a SAFE position. In that position, the function cam surface A1 positively maintains the sear 17 in latched engagement with the releasing edge 13 of the slide block 7. The SAFE condition will prevent retraction of the slide block 7 even in the presence of shock, vibration, or time-out of the timer 27.

In the FIG. 15 position, the locking recess 141 of the safety lock 39 remains in its unlocked position, biased against the cam section A3.

Referring now to FIG. 16, the cocked release mechanism 1 is shown with the function control set at ARM. In this setting, the arcuate cam surface A1 engages with the arming safety lock 39 to pivot the locking recess 141 into abutting and generally surrounding engagement with the locking pin 143. While the linkage assembly 35 remains free to retract upon time-out of the timer, a considerable steadying force is thus applied to that assembly 35 to guard against premature release due to shock or vibration.

It may be here reiterated that the timer cam follower 159, when retracted into the generally V-shaped notches 153b and 155b of the timer assembly upon time-out of the timer, will sharply release the slide block 7. Time-out of the timer may, however, be delayed even after the stop pin 95 is pulled, by manual depression of the auxiliary stop member 97 (FIGS. 8a and 8b).

FIGS. 17 and 18 depict the position of the slide lock 43 in the various function positions of the function control knob.

When the function control is set to the COCK position, the arcuate cam lobe B1 is operatively engaged with the slide lock 43 to pivot it about its axis 47 against the upward bias of the extension spring 49. As can be seen in FIG. 17, the notch 45 of the slide lock 43 is thereby raised out of the path of slide block 7 so that the lateral, cocking movement of slide block 7 will not be hindered.

FIG. 18 is illustrative of both the SAFE and ARM positions prior to cocking of the release mechanism 1. In these positions one of the flat surface B2 of the B cam section is operatively positioned over the slide lock 43. These two surfaces B2 are sufficiently spaced above the slide lock 43 to permit the extension spring to pull upwardly on one end of the lock and urge the blocking notch 45 downwardly about the pivot 47. In this position, the slide block 7 cannot be pulled to its cocking position due to the interference of the blocking notch 49, with the cam retaining edge 15 of the slide block. It will, however, be appreciated that with the slide block previously cocked through correct procedures, the slide lock 43, which is generally laterally offset from the sear 17, will merely rest on the slide block in the SAFE and ARM positions, as indicated in phantom in FIG. 18.

After the release device 1 of the present invention has been properly cocked(and preferably set to SAFE position), the hook assembly 75 is oriented to receive the ripcord (FIG. 7). Prior to the jump, the parachutist may set the ARM position. Upon leaving the aircraft, the stop pin 95(FIGS. 8a and 8b) is pulled by the cable 100 attached thereto, to place the timer 27 in operation. Generally a sport, as opposed to a military, parachutist would manually pull the stop pin upon leaving the aircraft. In such instances the pin may be tied to one end of a short lanyard or cord, the other end of which may be tied to the parachute harness to prevent loss.

If desired, the time-out of the timer may be delayed by manual depression of the auxiliary stop member 97 of the stop assembly 93. Eventually, the timer is permitted to time-out and release the slide block 7. At this time, the power spring 7 ultimately retracts the bowden cable 9 and the hook assembly 73 to pull the parachute ripcord.

If desired, or as a fail-safe, the D-ring 61 (FIG. 1) may be manually pulled to pull the ripcord 63 in a conventional manner.

SUMMARY OF ADVANTAGES

Thus, it may be seen that according to the present invention a novel improved parachute release device having delayed releasing means, a compact power spring of substantially constant force, and interrelated safety features is provided.

Particularly significant is the fact that the utilization of a spring of substantially constant force permits less area within the parachute release device to be allocated for the power means thus reducing the size and weight of the device. Also, it is significant that a substantially constant, and thus a comparatively lower force may be applied to the parachute ripcord, consequently minimizing damage to the parachute or the release device.

Of independent significance is the use of a slide assembly having positively engageable edges for holding and releasing the power spring. This slide assembly and the latches and locks associated therewith provide complementary engageable surfaces for secure latching, while also providing sharp spring release at the proper time.

Prevention of cocking other than in preselected orientations of a control knob is also advantageous from the standpoint of preventing damage and maintaining the integrity of the release mechanism.

Also of importance are the interrelated safety controls providing for a high degree of flexibility while insuring parachute release. The delayed releasing means is manually controllable to postpone release at the parachutist's option.

Added advantages are incorporated by the provision for a cam operated lock to positively prevent parachute release under any condition.

Of yet additional significance is the provision for selectively internally supporting, or buttressing, portions of the release device to prevent unintended release which may be accidentally caused by vibration or jarring.

By providing for a long delay device, advantageous flexibility of control, desirable in a parachute device, may also be realized. This is especially significant when extended periods of free fall are desired.

Although the present invention has been described in connection with one preferred and illustrated embodiment, it will be appreciated by those skilled in the art that additions, modifications, substitutions and deletions not specifically described may be made without departing from the spirit and scope of the invention as defined in the appended claims.

What is claimed is:

1. A parachute release device for pulling a parachute ripcord to release the parachute and comprising:

slidable release means mounted for movement between a cocked position and a retracted, parachute release position, for exerting a pulling force on the parachute ripcord;

cocking cam means, selectively engageable with and disengageable from said slidable release means, for selectively and releasably retaining said slidable release means in said cocked position;

substantially constant force power spring means connected to said slidable release means and movable between a stressed position, upon movement of said slidable release means to said cocked position, and a biased relaxed position, upon disengagement of said cocking cam means from said slidable release means, said power spring means being operative to pull said slidable release means to said retracted position upon movement to said biased position;

cocking means for moving said slidable release means from said retracted position to said cocked position; and delayed releasing means for disengaging said cocking cam means from said slidable release means upon the occurrence of a preselected condition.

2. The parachute release device according to claim 1 wherein:

said slidable release means includes a generally straight cam engageable releasing edge, and wherein:

said cocking cam means is cooperable with said releasing edge for selectively and releasably retaining said slidable release means in a cocked position.

3. The parachute release device according to claim 2 wherein:

said slidable release means includes a generally straight cam engageable retaining edge, and wherein said device further includes blocking cam means for selectively preventing movement of said slidable release means to said cocked position by engaging said retaining edge.

4. The parachute release device according to claim 3 wherein:

said slidable release means comprises a generally longitudinally movable slide block having said retaining edge and said releasing edge adjacent opposite ends thereof; and wherein:

said cocking cam means and said blocking cam means each comprise spring biased levers including notched portions cooperable respectively with said releasing edge and said retaining edge.

5. The parachute release device according to claim 4 and further including:

first function cam means including means for selectively maintaining said blocking cam means in a pivoted retaining edge blocking position, and second function cam means for selectively maintaining said cocking cam means in a pivoted position positively preventing movement of said releasing edge of slide block from engagement with the said notched portion of said cocking cam means.

6. The parachute release device according to claim 1 wherein:

said power spring means comprises at least one substantially planar, coilable spring element.

7. The parachute release device according to claim 1 wherein said cocking means comprises:

power shaft means connected to said slidable release means;

a bowden cable assembly including an extensible and retractable bowden cable operatively connected adjacent one end thereof to said power shaft means; and a hook assembly operatively connected to said bowden cable adjacent the other end thereof and slidably engageable with the parachute ripcord.

8. The parachute release device according to claim 1 wherein:

said delayed releasing means is a time delayed releasing means for disengaging said cocking cam means from said slidable release means upon the expiration of a selected period of time, said time delayed releasing means including:

a movable timer member mounted for movement between a time set position and a timed out position;

timer member biasing means for biasing said timer member toward said timed out position; and timer cam means for controlling movement of said timer member between said time set position and said timed out position;

said release device further including timer stop means normally disabling time out operation of said time delay releasing means and comprised of timer stop means including:

pull pin means movable between a first position for disabling said time delay means and a second position for permitting time out of said time delay means, and manually operable auxiliary stop means biased to a first position for permitting time out of said time delay means and selectively manually movable to a second position for disabling said time delay means for a desired period of time when said pull pin means is in its second position.

9. The parachute release device according to claim 1 wherein:

said delayed releasing means includes:

a movable delayed releasing means member biased to a release position and movable to a set position; and cam means for controlling movement of said movable member between its set position and its release position;

said release device further including linkage means for disengaging said cocking cam means to release said slidable release means, said linkage means comprising:

an extensible and contractible linkage assembly including control link means pinned in a slot in said cocking cam means, linkage assembly extending and retracting link means,pivotally pinned to said linkage assembly and connected to said biased movable delayed releasing means member;

said extending and retracting link means, upon movement of said biased, movable member to its biased position being operative to collapse said linkage assembly to move said cocking cam means away from said slidable release means through cooperation of said control link means and said slot, and said extending and retracting link means, upon movement of said biased member to a set position, being operative to extend said linkage assembly and reorient said control link means relative to said cocking cam means to permit said cocking cam means to engage said slidable release means; and safety latch means for engaging said linkage assembly in an extended position to buttress it against vibrational displacement while permitting retraction upon movement of said biased movable member to its release position.

10. The parachute release device according to claim 1 and further including:

function control means movable to a cock position, a safe position, and an arm position;

said function control means permitting cocking of said slidable release means only in said cock position;

said function control means positively preventing disengagement of said cocking cam means from said slidable release means in said safe position; and said function control means stabilizing said cocking cam means in said arm position.

11. A parachute release device for pulling a parachute ripcord to release the parachute and comprising:

slidable constant force release means slidably mounted for slidable movement between a cocked position and a retracted, parachute release position, for exerting a pulling force on the parachute ripcord;

said slidable release means including generally flat planar surfaces defining a generally straight cam engageable releasing edge;

cocking cam means, selectively and releasably engageable with and disengageable from said releasing edge for releasably retaining said slidable release means in said cocked position;

power spring means for biasing said slidable release means toward said release position;

cocking means for moving said release means from said release position to said cocked position; and delayed releasing means for disengaging said cocking cam means from said slidable release means.

12. The parachute release device according to claim 11 wherein:

said slidable release means includes a generally straight cam engageable retaining edge, and wherein said device further includes blocking cam means for selectively preventing movement of said slidable release means to said cocked position by engaging said retaining edge.

13. The parachute release device according to claim 12 wherein:

said slidable release means comprises a generally longitudinally movable slide block having said retaining edge and said releasing edge adjacent opposite ends thereof; and wherein:

said cocking cam means and said blocking cam means each comprise spring biased levers including portions cooperable respectively with said releasing edge and said retaining edge.

14. The parachute release device according to claim 13 and further including:

first function cam means including means for selectively maintaining said blocking cam means in a pivoted retaining edge blocking position, and second function cam means for selectively maintaining said cocking cam means in a pivoted position positively preventing movement of said releasing edge of slide block from engagement with the said portion of said cocking cam means.

15. The parachute release device according to claim 12 wherein:

said slidable release means comprises a generally longitudinally movable slide block having said cam engageable releasing edge and said cam engageable retaining edge adjacent opposite ends thereof;

said cocking cam means comprising a sear, pivotally mounted for rotation about a pivot axis extending generally transversely of and offset from the longitudinal path of movement of said slide block, and including a notch selectively engageable with and disengageable from said cam engageable releasing edge upon move-ment of said slidable release means to said cocked position;

said blocking cam means comprising a blocking lever, pivotally mounted about a pivot axis extending generally transversely of and offset from the path of movement of said slide block, and including a blocking portion cooperable with said cam engageable retaining edge, the device further including:

sear biasing means for normally biasing said sear toward a pivoted position for releasable engagement between said notch and said cam engageable releasing edge;

blocking lever biasing means for normally biasing said blocking lever toward a pivoted position wherein said blocking portion is interposed in the path of movement of said slide block to prevent movement of said slidable releasing means to said cocked position by engagement between said blocking portion and said cam engageable retaining edge, said delayed releasing means comprising time delayed releasing means for disengaging said sear notch from said cam engageable retaining edge upon the expiration of a selected period of time;

said time delayed releasing means including:

a movable timer member mounted for movement between a time set position and a timed out position;

timer member biasing means for biasing said timer member toward said timed out position; and timer cam means for controlling movement of said timer member between said time set position and said timed out position;

linkage means for disengaging said cocking cam means to release said slidable release means by operatively transmitting movement of said timer member to said cocking cam means;

said linkage means comprising:

an extensible and contractible linkage assembly including sear control link means pinned in a slot in said sear, said slot extending generally transversely of the path of movement of said slide block and generally transversely of said sear pivot axis;

linkage assembly extending and retracting link means pivotally pinned to said linkage assembly and connected to said timer member;

said extending and retracting link means, upon movement of said biased timer member to a timed out position, being operative to collapse said linkage assembly to pivot said sear away from said biased pivoted position through cooperation of said sear control link means and said slot in said sear, and said extending and retracting link means, upon movement of said biased timer member to a time set position, being operative to extend said linkage assembly and reorient said sear control link means relative to said sear slot, to permit said sear biasing means to urge said sear toward said biased pivoted position.

16. A parachute release device for pulling a parachute ripcord to release the parachute and comprising:

release means movable between a cocked position and a parachute release position for exerting a pulling force on the parachute ripcord;

cam retaining means engageable with and disengageable from said release means for selectively and releasably retaining said release means in said cocked position;

power spring means for biasing said release means toward said release position;

cocking means for moving said release means from said release position to said cocked position;

collapsible and extendable linkage means connected to said retaining means for disengaging said retaining means from said release means;

delayed releasing means for controlling said collapsible and extensible linkage means; and function control means movable to a cock position, a safe position and an arm position; said function control means including:

first means to permit cocking of said release means only when said function control means is in said cock position, and to preclude such cocking movement in said safe and arm positions;

second means cooperable with said cam retaining means to permit cocking movement of said slidable release means when said function control means is in said cock position, and to positively lock said cam retaining means from releasing said release means when said function control means is in said safe position, and third means cooperable with said linkage assembly in an extended position to stabilize said linkage assembly against vibrational displacement while permitting collapse of said linkage assembly upon operation of said delayed releasing means.

17. The parachute release device according to claim 16 wherein:

said third means includes safety latch means pivotally mounted and biased toward a retracted position, said safety latch including a safety recess and being movable to an operative position for generally surrounding and engaging a pin on said linkage assembly to stabilize said linkage assembly in an extended position.

18. The parachute release device according to claim 17 wherein:

said first, second and third means comprise an integrated function cam including camming means for selectively moving said safety latch to said operative position, camming means for selectively preventing cocking movement of said release means, and camming means for selectively maintaining said cam retaining means in locked engagement with said cam retaining means.

19. The parachute release device according to claim 16 wherein said delayed releasing means is a time delayed releasing means and further including:

timer stop means normally disabling time out operation of said time delay releasing means and operable to permit such time out operation;

said timer stop means including a stop pin assembly comprising:

a pull pin means movable between a first position for disabling said time delay means and a second position for permitting time out of said time delay means, and manually operable auxiliary stop means biased to a first position for permitting time out of said time delay means and selectively manually movable to a second position for disabling said time delay means for a desired period of time when said pull pin means is in its second position.

20. In a parachute release device for pulling a ripcord to release the parachute, the improvement comprising:

time delayed releasing means for supplying a release initiating stroke to said ripcord; and timer stop means normally disabling time out operation of said time delay releasing means and operable to permit such time out operation;

said timer stop means including a stop pin assembly comprising:

a pull pin means movable between a first position for disabling said time delay means and a second position for permitting time out of said time delay means, and manually operable auxiliary instantaneous stop means biased to a first position for permitting time out of said time delay means and selectively manually movable to a second position for disabling said time delay means for a desired period of time when said pull pin means is in its second position , said stop means being spring biased to disable said time delay means in said second position through the application of pressure thereto, and said stop means is further spring biased to automatically return to said first position after said manual operation thereof ceases.

21. The improvement according to claim 20 wherein: said time delayed releasing means is selectively settable for a time delay up to about 60 seconds.

22. A parachute release device for pulling a parachute ripcord to release the parachute, the device comprising:

slidable release means slidably movable between a cocked position and a retracted, parachute release position for exerting a pulling force on the parachute ripcord;

said slidable release means comprising a generally longitudinally movable slide block having a cam engageable releasing edge and a cam engageable retaining edge adjacent opposite ends thereof;

said releasing edge and said retaining edge being defined by intersecting, generally planar surfaces;

cocking cam means for selectively and releasably retaining said slidable release means in said cocked position;

said cocking cam means comprising a sear, pivotally mounted for rotation about a pivot axis extending generally transversely of and offset from the longitudinal path of movement of said slide block, and including a notch selectively engageable with and disengageable from said cam engageable releasing edge upon movement of said slidable release means to said cocked position;

blocking cam means for selectively preventing movement of said slidable release means to said cocked position;

said blocking cam means comprising a blocking lever, pivotally mounted about a pivot axis extending generally transversely of and offset from the path of movement of said slide block, and including a blocking portion cooperable with said cam engageable retaining edge;

sear biasing means for normally biasing said sear toward a pivoted position for releasable engagement between said notch and said cam engageable releasing edge;

blocking lever biasing means for normally biasing said blocking lever toward a pivoted position wherein said blocking portion is interposed in the path of movement of said slide block to prevent movement of said slidable releasing means to said cocked position by engagement between said blocking portion and said cam engageable retaining edge, power spring means for biasing said release means toward said release position;

said power spring means comprising substantially constant force power spring connected to said slide block adjacent the said end thereof having said cam engageable releasing edge, and movable between a stressed position, upon movement of said slidable release means to said cocked position, and a biased relaxed position, upon disengagement of said sear notch from said cam engageable releasing edge;

said power spring means further comprising at least one substantially planar, coilable spring element and being operable to pull said slidable release means to said retracted release position upon movement to said relaxed position;

cocking means for moving said slidable release means from said retracted position to said cocked position;

said cocking means comprising:
power shaft means connected to said slide block adjacent the said end thereof having said cam engageable retaining edge,
a bowden cable assembly including an extensible and retractable bowden cable operatively connected adjacent one end thereof to said power shaft means, and
a hook assembly operatively connected to said bowden cable adjacent the other end thereof and slidably engageable with the parachute ripcord;

time delayed releasing means for disengaging said sear notch from said cam engageable retaining edge upon the expiration of a selected period of time;

said time delayed releasing means including:
a movable timer member mounted for movement between a time set position and a timed out position;
timer member biasing means for biasing said timer member toward said timed out position; and
timer cam means for controlling movement of said timer member between said time set position and said timed out position;

linkage means for disengaging said cocking cam means to release said slidable release means by operatively transmitting movement of said timer member to said cocking cam means;

said linkage means comprising:
an extensible and contractible linkage assembly including sear control link means pinned in a slot in said sear, said slot extending generally transversely of the path of movement of said slide block and generally transversely of said sear pivot axis;
linkage assembly extending and retracting link means pivotally pinned to said linkage assembly and connected to said timer member;
said extending and retracting link means, upon movement of said biased timer member to a timed out position, being operative to collapse said linkage assembly to pivot said sear away from said biased pivoted position through cooperation of said sear control link means and said slot in said sear, and
said extending and retracting link means, upon movement of said biased timer member to a time set position, being operative to extend said linkage assembly and reorient said sear control link means relative to said sear slot, to permit said sear biasing means to urge said sear toward said biased pivoted position;

timer stop means normally disabling time out operation of said time delay releasing means and operable to permit such time out operation;

said timer stop means including a stop pin assembly comprising:
a pull pin means movable between a first position for disabling said time delay means and a second position for permitting time out of said time delay means, and
manually operable auxiliary stop means biased to a first position for permitting time out of said time delay means and selectively manually movable to a second position for disabling said time delay means for a desired period of time when said pull pin means is in its second position; and function control means movable to a cock position, a safe position and an arm position; said function control means including:
first means cooperable with said blocking cam means to permit cocking of said slidable release means only when said function control means is in said cock position, and to preclude such cocking movement in said safe and arm position, second means cooperable with said cocking cam means to permit cocking movement of said slidable release means when said function control means is in said cock position, and to positively lock said cocking cam means from releasing said slidable release means when said function control means is in said safe position regardless of time out of said time delayed means, third means cooperable with said linkage assembly in an extended position to stabilize said linkage assembly against vibrational displacement while permitting collapse of said linkage assembly upon time out of said time delayed means, said third means including a safety latch pivotally mounted on said sear and biased toward a retracted position, said safety latch including a safety recess and being movable to an operative position for generally surrounding and engaging a pin on said linkage assembly to stabilize said linkage assembly in an extended position, and said first, second and third means comprising an integrated function cam including camming means for selectively moving said safety latch to said operative position, camming means for selectively maintaining said blocking lever in said blocking position, and camming means for selectively maintaining said sear notch in locked engagement with said releasing edge of said slide block.

23. In a parachute release device for pulling a ripcord to release the parachute, the improvement comprising:

time delayed releasing means for supplying a release initiating stroke to said ripcord; and substantially constant force power spring means for pulling on said parachute ripcord with a substantially constant force upon supply of said release initiating stroke by said time delayed releasing means;

said time delayed releasing means being electively settable for a time delay up to about 60 seconds.

24. A method of releasing a parachute ripcord with a parachute release device having a time delayed releasing means selectively settable for a time period up to about 60 seconds, the method comprising:

automatically enabling the time delayed releasing means upon leaving an aircraft;

manually disabling the releasing means for a selected period of time;

reenabling the releasing means; and automatically applying a substantially constant force to pull the parachute ripcord and release the parachute upon time out of the time delayed releasing means.

* * * * *